United States Patent
Hashimoto et al.

(10) Patent No.: US 9,469,740 B2
(45) Date of Patent: Oct. 18, 2016

(54) CARBON-FIBER-REINFORCED PLASTIC AND PROCESS FOR PRODUCING SAME

(75) Inventors: Takafumi Hashimoto, Nagoya (JP); Hirohito Minowa, Otsu (JP); Takashi Shimada, Otsu (JP); Masahiro Hashimoto, Ehime (JP); Katsuhiro Miyoshi, Nagoya (JP); Yoshihiro Naruse, Nagoya (JP)

(73) Assignee: Toray Industries, Inc. (JP)

( * ) Notice: Subject to any disclaimer, the term of this patent is extended or adjusted under 35 U.S.C. 154(b) by 229 days.

(21) Appl. No.: 14/122,501

(22) PCT Filed: Apr. 18, 2012

(86) PCT No.: PCT/JP2012/060437
§ 371 (c)(1),
(2), (4) Date: Dec. 20, 2013

(87) PCT Pub. No.: WO2012/165076
PCT Pub. Date: Dec. 6, 2012

(65) Prior Publication Data
US 2014/0094555 A1 Apr. 3, 2014

(30) Foreign Application Priority Data
May 31, 2011 (JP) .................... 2011-122410

(51) Int. Cl.
| | |
|---|---|
| *C08K 3/04* | (2006.01) |
| *C08J 5/04* | (2006.01) |
| *B29C 70/06* | (2006.01) |
| *B29C 70/14* | (2006.01) |
| *C08J 5/24* | (2006.01) |

(52) U.S. Cl.
CPC ............... *C08K 3/04* (2013.01); *B29C 70/06* (2013.01); *B29C 70/14* (2013.01); *C08J 5/042* (2013.01); *C08J 5/24* (2013.01); *C08J 2300/22* (2013.01); *C08J 2377/00* (2013.01)

(58) Field of Classification Search
CPC .......... B29C 70/06; C08K 3/04; C08K 7/06; C08K 2201/004
See application file for complete search history.

(56) References Cited

U.S. PATENT DOCUMENTS

2010/0028593 A1* 2/2010 Taketa ................. B29C 43/222
428/113

FOREIGN PATENT DOCUMENTS

| | | | |
|---|---|---|---|
| JP | 4-208407 | | 7/1992 |
| JP | H06313292 A | * | 11/1994 |
| JP | 2001-521449 A | | 11/2001 |
| JP | 2002-212311 A | | 7/2002 |
| JP | 2002-309007 | | 10/2002 |
| JP | 2004-043985 A | | 2/2004 |
| JP | 2009-274412 | | 11/2009 |
| JP | 2010-037358 A | | 2/2010 |
| JP | 2010-229238 A | | 10/2010 |
| JP | 2010-235779 A | | 10/2010 |
| WO | 2007/097436 A1 | | 8/2007 |
| WO | 2010/013645 A1 | | 2/2010 |

OTHER PUBLICATIONS

Machine translation of JP2010229238, 2010.*
Machine translation of JP H06313292 A, 1994.*

* cited by examiner

*Primary Examiner* — Wenwen Cai
(74) *Attorney, Agent, or Firm* — DLA Piper LLP (US)

(57) ABSTRACT

A carbon-fiber-reinforced plastic prepared by impregnating a matrix resin into a sheet-like base material includes discontinuous carbon fibers, wherein a content ratio of carbon fibers having lengths of 10 mm or longer in the base material is 60 wt % or more relative to a total amount of the carbon fibers, and an average value of orientation degrees of carbon fibers contained in the base material is 2-10.

10 Claims, 10 Drawing Sheets

CARBON-FIBER-REINFORCED PLASTIC AND PROCESS FOR PRODUCING SAME

TECHNICAL FIELD

This disclosure relates to a carbon-fiber-reinforced plastic and a process of producing the same and, specifically, to a sheet-like carbon-fiber-reinforced plastic having high mechanical properties in a specified direction while maintaining an excellent moldability, and a process of producing the same.

BACKGROUND

A carbon-fiber-reinforced plastic comprising carbon fibers and a matrix resin (hereinafter, also referred to as a "CFRP") is developed broadly in various uses because it is excellent in mechanical properties, light-weight property, corrosion resistance and the like. As a process of producing a CFRP, although there is a process using a so-called "prepreg" which is impregnated with a resin in advance, in a case where it is required to broaden the range of the moldable shape of CFRP and shorten the time required for molding, for example, in a case where a mass production is required such as in parts for vehicles or parts for electronic equipment, a process is frequently employed wherein a carbon fiber base material (dry-type carbon fiber base material) substantially containing no resin is formed in a predetermined shape, and by impregnating a matrix resin thereinto, a desired CFRP is molded.

In such a process of molding a CFRP by impregnating a matrix resin into a dry-type carbon fiber base material, in a case of a CFRP molded using a base material formed by using continuous carbon fibers, although the mechanical properties are excellent, because the continuous carbon fibers are hard to move at the steps of shape forming and molding, the moldability (shape formability) into a desired shape is poor. On the other hand, in a case of a CFRP molded using a base material formed by using discontinuous carbon fibers, although the moldability (shape formability) is excellent because the carbon fibers can easily move, only low mechanical properties can be achieved.

Further, in a case of a so-called "unidirectional" (UD) prepreg or a UD tape obtained by arranging continuous carbon fibers in one direction because the mechanical properties in the direction oriented with the carbon fibers are very high, by disposing the carbon fiber base material in a direction applied with a load when a CFRP product is designed, a product having desired mechanical properties in a specified direction can be made with a lower amount of material. However, in a case of a CFRP using a base material composed of discontinuous carbon fibers to obtain excellent moldability (shape formability), a CFRP provided with such a high anisotropy to mechanical properties has not existed to date. Thus, it has been difficult to obtain a material satisfying both of shape formability and mechanical properties in a specified direction.

Although CFRPs using base materials composed of discontinuous carbon fibers are disclosed in JP-A-2010-235779, JP-A-2010-37358, JP-A-2002-212311, JP-A-2004-43985 and the like, all of these aim to achieve a good isotropy with respect to mechanical properties, and there is no description as to a technical concept of intentionally providing a high anisotropy. In particular, there is not any suggestion as to a technical concept of intentionally providing a high anisotropy at a stage of a carbon fiber base material which is not yet impregnated with a resin. Further, although JP-A-2010-229238 mentions with respect to anisotropy (a flexural elastic modulus in a specified direction is 2,500 GPa or more), it does not mention the degree of anisotropy (orientation degree).

Accordingly, it could be helpful to provide a carbon-fiber-reinforced plastic capable of realizing achievement of excellent mechanical properties in a desired direction with a small amount of carbon fibers by imparting an anisotropy in a specified range particularly at a stage of a carbon fiber base material before resin impregnation while utilizing good shape formability and moldability in a case of using a base material composed of discontinuous carbon fibers, and a process of producing the same.

SUMMARY

We provide a carbon-fiber-reinforced plastic prepared by impregnating a matrix resin into a sheet-like base material composed of discontinuous carbon fibers, wherein a content ratio of carbon fibers having lengths of 10 mm or longer in the base material is 60 wt % or more relative to a total amount of carbon fibers, and an average value of orientation degrees of carbon fibers contained in the base material is 2-10.

We also provide the carbon-fiber-reinforced plastic according to step 1, wherein a maximum value σMax of tensile elastic moduli determined in different tensile directions is 10 GPa or more.

We further provide the carbon-fiber-reinforced plastic according to step 1, wherein a ratio (σMax/σMin) of a maximum value σMax to a minimum value σMin of tensile elastic moduli determined in different tensile directions is 2-10.

We further provide the carbon-fiber-reinforced plastic according to step 1, wherein the matrix resin comprises a thermoplastic resin.

We further provide the carbon-fiber-reinforced plastic according to step 1, wherein, with respect to carbon fibers contained in the sheet-like base material composed of discontinuous carbon fibers, a ratio of bundle-like fiber aggregates each gathered with 80 or more carbon fibers relative to a total amount of carbon fibers contained in the sheet-like base material is 3 wt % or more and 40 wt % or less.

We further provide a process of producing a carbon-fiber-reinforced plastic including forming discontinuous carbon fibers having an average fiber length of 10 mm or longer in a sheet-like base material, and thereafter impregnating a matrix resin into the sheet-like base material, wherein formation of the sheet-like base material is performed by carding such that an average value of orientation degrees of carbon fibers contained in the base material is 2-10.

We further provide the process according to step 6, wherein a ratio (tMax/tMin) of a maximum value tMax to a minimum value tMin of rupture strengths of the sheet-like base material determined in different tensile directions is 2-10.

We further provide the process according to step 6, wherein needle punching is carried out at a condition of 300/cm² or less to the sheet-like base material formed by carding.

We further provide the process according to step 6, wherein, when the sheet-like base material is formed by carding, the carding is performed at a condition where discontinuous organic fibers are mixed in discontinuous carbon fibers and, after carding, pressing is performed after at least a part of the organic fibers are molten.

We further provide the process according to step 6, wherein a thermoplastic resin is used as the matrix resin.

We further provide the carbon-fiber-reinforced plastic according to step 2, wherein a ratio ($\sigma$Max/$\sigma$Min) of a maximum value $\sigma$Max to a minimum value $\sigma$Min of tensile elastic moduli determined in different tensile directions is 2-10.

We further provide the carbon-fiber-reinforced plastic according to step 2, wherein the matrix resin includes a thermoplastic resin.

We further provide the carbon-fiber-reinforced plastic according to step 3, wherein the matrix resin includes a thermoplastic resin.

We further provide the carbon-fiber-reinforced plastic according to step 2, wherein, with respect to carbon fibers contained in the sheet-like base material composed of discontinuous carbon fibers, a ratio of bundle-like fiber aggregates each gathered with 80 or more carbon fibers relative to a total amount of carbon fibers contained in the sheet-like base material is 3 wt % or more and 40 wt % or less.

We further provide the carbon-fiber-reinforced plastic according to step 3, wherein, with respect to carbon fibers contained in the sheet-like base material composed of discontinuous carbon fibers, a ratio of bundle-like fiber aggregates each gathered with 80 or more carbon fibers relative to a total amount of carbon fibers contained in the sheet-like base material is 3 wt % or more and 40 wt % or less.

We further provide the carbon-fiber-reinforced plastic according to step 4, wherein, with respect to carbon fibers contained in the sheet-like base material composed of discontinuous carbon fibers, a ratio of bundle-like fiber aggregates each gathered with 80 or more carbon fibers relative to a total amount of carbon fibers contained in the sheet-like base material is 3 wt % or more and 40 wt % or less.

We further provide the process according to step 7, wherein needle punching is carried out at a condition of 300/cm$^2$ or less to the sheet-like base material formed by carding.

We further provide the process according to step 7, wherein, when the sheet-like base material is formed by carding, the carding is performed at a condition where discontinuous organic fibers are mixed in discontinuous carbon fibers and, after carding, pressing is performed after at least a part of the organic fibers are molten.

We further provide the process according to step 8, wherein, when the sheet-like base material is formed by carding, the carding is performed at a condition where discontinuous organic fibers are mixed in discontinuous carbon fibers and, after carding, pressing is performed after at least a part of the organic fibers are molten.

Thus, in the carbon-fiber-reinforced plastic and the process of producing the same, since, at the stage of the sheet-like base material, an adequate anisotropy is intentionally imparted to the discontinuous carbon fibers such that the average value of the orientation degrees falls within a predetermined range, it becomes possible to produce a CFRP with a small amount of carbon fibers while maintaining the shape formability of the sheet-like base material and the moldability into the CFRP satisfactorily.

EXPLANATION OF SYMBOLS

1: carding machine
2: cylinder roll
3: take-in roll
4: doffer roll
5: worker roll
6: stripper roll
7: feed roll
8: belt conveyer
9: discontinuous carbon fibers
10: sheet-like web
11: sample for determination
12: base table
13: three-dimensional image data
14: fine region
15: scanning line
16: carbon fiber

DETAILED DESCRIPTION

A carbon-fiber-reinforced plastic is prepared by impregnating a matrix resin into a sheet-like base material composed of discontinuous carbon fibers, and is characterized in that a content ratio of carbon fibers having lengths of 10 mm or longer (preferably, 20 mm or longer) in the base material is 60 wt % or more relative to the total amount of carbon fibers and an average value of orientation degrees of carbon fibers contained in the base material is 2-10. The orientation degree of carbon fibers is defined as described later and means a degree enhanced with an orientation of carbon fibers in a specified direction as compared to an orientation of carbon fibers in another direction.

In such a carbon-fiber-reinforced plastic, by making a CFRP by impregnating a resin into a sheet-like base material prepared by orienting discontinuous carbon fibers having lengths more than a certain level in a specified direction, a CFRP having high mechanical properties such as strength and elastic modulus in the specified direction can be obtained by a condition where many discontinuous carbon fibers are oriented in the above-described specified direction with orientation degrees in the predetermined range while excellent moldability and shape formability of the base material formed by the discontinuous carbon fibers are maintained. The orientation degrees of the carbon fibers in the predetermined range are intentionally provided and if the average value of the orientation degrees is less than 2 because the degree of anisotropy in the above-described specified direction is small, the difference from the conventional technologies aiming achievement of a good isotropy with respect to mechanical properties becomes small. Therefore, the mechanical properties in the above-described specified direction become relatively low and, if desired high mechanical properties are sought, it becomes necessary to increase the amount of carbon fibers used.

Further, in a case where the average value of the orientation degrees exceeds 10, although the degree of anisotropy in the above-described specified direction is enhanced, there is a fear that the orientation degrees in directions other than the above-described specified direction, in particular, in a direction perpendicular to the above-described specified direction, become relatively too low, whereby the form keeping ability, ultimately the shape formability, at the stage of the sheet-like base material may be lowered and formability of the base material into a desired shape and the moldability into CFRP may be lowered. By the condition where the average value of the orientation degrees of carbon fibers is 2-10, namely, by the condition where at the stage of the base material an anisotropy in a predetermined range is imparted to the orientation of the carbon fibers, the shape formability and the moldability are excellent as well as a CFRP excellent in mechanical properties in the specified direction can be obtained with a small amount of carbon fibers. Then, even if the discontinuous carbon fibers are oriented at such an anisotropy to surely make the sheet-like base material maintain good form keeping ability and shape formability and make the carbon-fiber-reinforced plastic impregnated with a matrix resin exhibit high mechanical properties in the above-described specified direction, the condition is employed where the content ratio of carbon fibers having lengths of 10 mm or longer (preferably, 20 mm or longer) in the base material is 60 wt % or more relative to the total amount of carbon fibers.

By this, even in the condition being imparted with anisotropy as described above, it becomes possible that carbon fibers adequately come into contact with each other and they are held with each other, and it becomes possible to maintain good form keeping ability and shape formability of the sheet-like base material, further, to maintain the orientation degrees in the above-described predetermined range, thereby realizing high mechanical properties in the above-described specified direction of the carbon-fiber-reinforced plastic at a small amount of carbon fibers.

In the above-described carbon-fiber-reinforced plastic, it is preferred that a maximum value σMax of tensile elastic moduli determined in different tensile directions (namely, determined in all directions in plane) is 10 GPa or more. Although this maximum value of tensile elastic moduli appears in the above-described specified direction to exhibit target high mechanical properties, the maximum value σMax of tensile elastic moduli is preferably 10 GPa or more. Achievement of a maximum value of tensile elastic moduli of 10 GPa or more can be realized by the above-described adequate control of orientation degrees as well as length of carbon fibers, content of carbon fibers in CFRP, kind of carbon fibers and the like.

Further, it is preferred that a ratio (σMax/σMin) of a maximum value σMax to a minimum value σMin of tensile elastic moduli determined in different tensile directions is 2-10. This range of the ratio just corresponds to the above-described range of the average value of orientation degrees which becomes an index of a degree of anisotropy. Namely, if the above-described range of the average value of orientation degrees is 2-10, the ratio of the maximum value/the minimum value of the tensile elastic modulus, which exhibits depending upon the oriented carbon fibers, also appears substantially 2-10.

Further, although it is possible to use a thermosetting resin as a matrix resin used, it is preferred to use a thermoplastic resin from the viewpoint of serving to molding of products at mass production by impregnating the resin into a sheet-like base material of discontinuous carbon fibers by injection molding and the like in a short period of time, and from the viewpoint of managing various shapes to be molded more easily. Although the thermoplastic resin is not particularly restricted, for example, can be used polyolefin, ABS, polyamide, polyester, polyphenylene ether, polyacetal, polycarbonate, polyphenylene sulfide, polyimide, polyetherimide, polyethersulfone, polyketone, polyetheretherketone, a combination thereof and the like.

Furthermore, it is preferred that, with respect to carbon fibers contained in the above-described sheet-like base material composed of discontinuous carbon fibers, a ratio of bundle-like fiber aggregates each gathered with 80 or more carbon fibers relative to the total amount of carbon fibers contained in the sheet-like base material is 3 wt % or more and 40 wt % or less.

A process of producing a carbon-fiber-reinforced plastic by forming discontinuous carbon fibers having an average fiber length of 10 mm or longer (preferably, 20 mm or longer) in a sheet-like base material and thereafter impregnating a matrix resin into the sheet-like base material, is characterized in that formation of the sheet-like base material is performed by carding such that an average value of orientation degrees of carbon fibers contained in the base material is 2-10. Namely, to orient the discontinuous carbon fibers having a certain-level length as described above by intentionally imparting anisotropy so that the average value of the orientation degrees falls is 2-10, the carbon fibers are carded in our process. By such carding, it is possible to control the above-described average value of the orientation degrees of the discontinuous carbon fibers within the predetermined range. A concrete manner for the carding will be exemplified in Examples described later.

In this process of producing a carbon-fiber-reinforced plastic, it is preferred that a ratio (tMax/tMin) of a maximum value tMax to a minimum value tMin of rupture strengths of the above-described sheet-like base material determined in different tensile directions is 2-10. This ratio just corresponds to the above-described range of the average value of orientation degrees which becomes an index of a degree of anisotropy. Namely, if the above-described average value of orientation degrees is 2-10, the ratio of the maximum value/the minimum value of the rupture strengths of the sheet-like base material, which tends to exhibit depending upon the resistance due to contact of the oriented carbon fibers with each other, tends to also appear substantially at 2-10.

Further, it is preferred that needle punching is not carried out to the above-described sheet-like base material formed by carding, or if carried out, needle punching is performed at a condition of 300/cm² or less. Although it is possible to improve the resin impregnation property by carrying out the needle punching to the sheet-like base material composed of discontinuous carbon fibers because an anisotropy in a predetermined range is intentionally imparted to the orientation of the discontinuous carbon fibers, it is intended that such an anisotropy controlled in the predetermined range is not greatly damaged by carrying out the needle punching and the resin impregnation property is tried to be improved to an adequate extent.

Further, it is also preferred that, when the sheet-like base material is formed by the above-described carding, the carding is performed at a condition where discontinuous organic fibers are mixed in discontinuous carbon fibers, and after carding, pressing is performed after at least a part of the organic fibers are molten. Namely, by melting at least a part of the organic fibers at a condition where an adequately small amount of organic fibers are mixed in discontinuous carbon fibers and the carbon fibers are oriented such that an anisotropy is intentionally imparted so that the average value of the orientation degrees of the carbon fibers falls within the above-described predetermined range, a function of a binder to keep the formation is given to the organic fibers, and by performing the pressing at such a condition, the kept formation is approximately fixed via the organic fibers. In such a manner, when the sheet-like base material is handled and the matrix resin is impregnated, the predetermined anisotropy of the orientation of carbon fibers can be maintained more securely, and while the shape formability of the sheet-like base material can be maintained, it can be achieved more easily to exhibit high mechanical properties in the specified direction after molding of CFRP by a small amount of carbon fibers.

Also, it is preferred to use a thermoplastic resin as the above-described matrix resin.

Hereinafter, desirable examples will be explained referring to the figures.

In our process of producing a carbon-fiber-reinforced plastic, a sheet-like base material composed of carbon fibers is formed by carding so that the average value of orientation degrees of carbon fibers contained in the base material is 2-10. The carding means an operation of arranging the direction of discontinuous carbon fibers or refining carbon fibers together with arranging the direction of the carbon fibers by applying a force in approximately the same direction to an aggregate of discontinuous carbon fibers with a comb-like member. Generally, it is performed using a carding machine equipped with a roll having many needle-like projections on the surface and/or a roll wound with a metallic wire having saw blade-like projections. A concrete example of the whole of the carding machine will be described later.

When such a carding is carried out, it is preferred to control the time (residing time), during which carbon fibers reside in the carding machine, to be short, to prevent the carbon fibers from being folded. Concretely, it is preferred to transfer the carbon fibers existing on the wires wound onto a cylinder roll of the carding machine to a doffer roll present at a downstream side in a time as short as possible. Therefore, to accelerate such a transfer, it is preferred to rotate the cylinder roll at a high rotational speed, for example, such as 300 rpm or higher. Further, for a similar reason, the surface speed of the doffer roll is preferably a high speed, for example, such as 10 m/min. or higher.

Further, similarly, it is important to widen the clearance between respective rolls to a certain degree as compared to that in the carding of usual organic fibers to prevent carbon fibers from sinking on the surfaces of the cylinder roll, worker rolls, stripper rolls (refer to concrete structural examples described later), and the like by being pressed thereto. For example, the respective clearances between rolls of the cylinder roll, worker rolls and stripper rolls are set preferably at 0.5 mm or more, more preferably at 0.7 mm or more, and further preferably at 0.9 mm or more.

Figure 1:
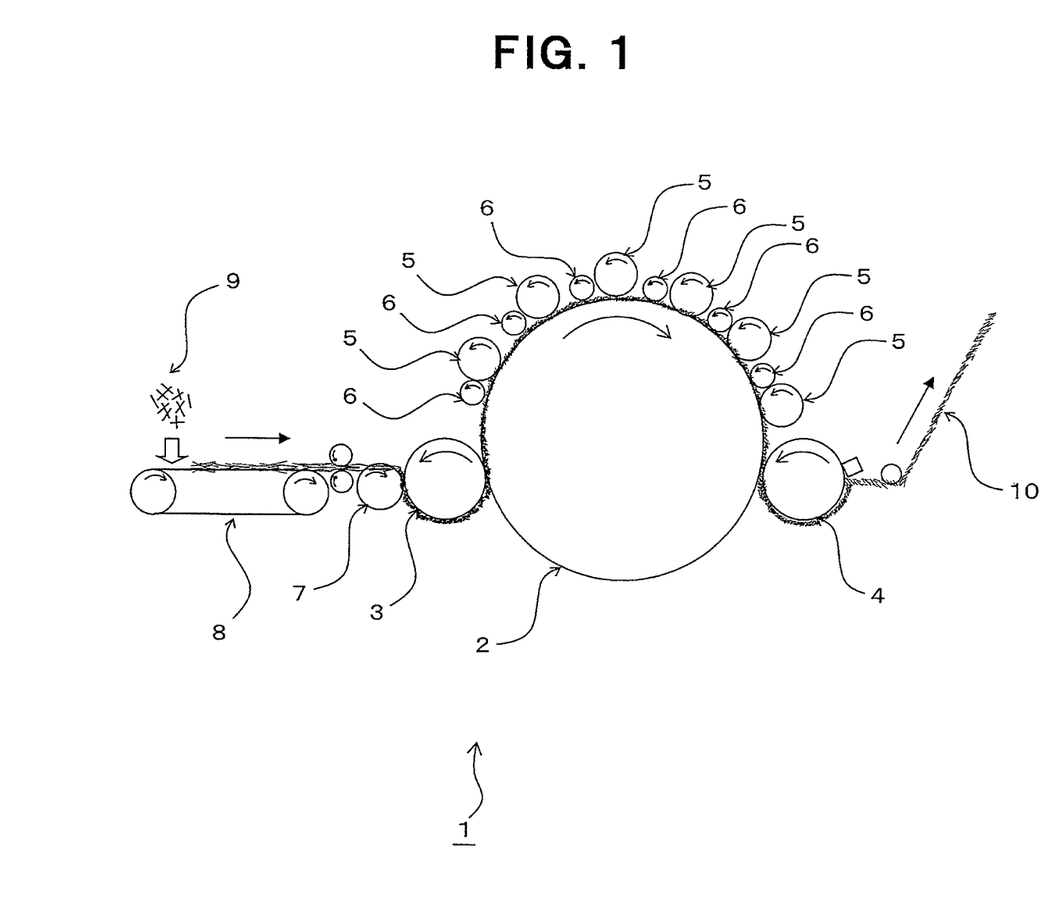
FIG. 1 is a modified diagram showing an example of an apparatus used for a carding step in an example of our process of producing a carbon-fiber-reinforced plastic.

FIG. 1 shows an example of an apparatus used for a carding step in a process of producing a carbon-fiber-reinforced plastic. A carding machine 1 shown in FIG. 1 mainly comprises a cylinder roll 2, a take-in roll 3 provided at an upstream side and closely to the outer circumferential surface of the cylinder roll 2, a doffer roll 4 provided closely to the outer circumferential surface of the cylinder roll 2 at a downstream side which is a side opposite to the side of the take-in roll 3, a plurality of worker rolls 5 provided closely to the outer circumferential surface of the cylinder roll 2 between the take-in roll 3 and the doffer roll 4, stripper rolls 6 provided closely to the worker rolls 5, and a feed roll 7 provided closely to the take-in roll 3, and a belt conveyer 8.

Aggregates of discontinuous carbon fibers 9, in which the content ratio of carbon fibers having lengths of 10 mm or longer (preferably, 20 mm or longer) is 60 wt % or more relative to the total amount of carbon fibers, are supplied to belt conveyer 8, and the discontinuous carbon fibers 9 are introduced onto the outer circumferential surface of cylinder roll 2 through the outer circumferential surface of feed roll 7 and then through the outer circumferential surface of take-in roll 3. Up to this stage, discontinuous carbon fibers 9 become a floc-like form. Although a part of the floc-like carbon fibers introduced onto the outer circumferential surface of cylinder roll 2 wind around the outer circumferential surface of the respective worker rolls 5, these carbon fibers are stripped off by the respective stripper rolls 6 and returned again onto the outer circumferential surface of the cylinder roll 2.

Many needles, projections exist at standing conditions on the outer circumferential surfaces of the respective rolls of feed roll 7, take-in roll 3, cylinder roll 2, worker rolls 5 and stripper rolls 6, and in the above-described steps, by operation of the needles, carbon fibers are refined into a single-fiber condition and at the same time the directions of most carbon fibers are arranged in a specified direction namely, in the rotational direction of cylinder roll 2. The carbon fibers, refined and promoted in fiber orientation through such steps, move onto the outer circumferential surface of doffer roll 4 as a sheet-like web 10 which is one form of a carbon fiber aggregate. Further, by drawing the web 10 while narrowing the width thereof to a predetermined width, a sheet-like base material composed of discontinuous carbon fibers is formed. This carding is performed to intentionally control the average value of orientation degrees of carbon fibers contained in the sheet-like base material to 2-10.

In the carding as described above, although the aggregate of discontinuous carbon fibers 9 may be formed by only carbon fibers, the carding can also be performed at a condition mixed with discontinuous organic fibers, in particular, thermoplastic resin fibers. In particular, it is preferred to add thermoplastic resin fibers when the carding is performed, because breakage of carbon fibers at the carding can be prevented. Because carbon fibers are rigid and fragile, they are hard to be tangled and liable to be broken. Therefore, there is a problem in the carbon fiber aggregate formed by only carbon fibers that during the carding, carbon fibers are easily cut or carbon fibers are liable to fall off. Accordingly, by containing thermoplastic resin fibers which are flexible and easily tangled, a carbon fiber aggregate in which the carbon fibers are hard to cut and the carbon fibers are hard to fall off, can be formed.

Further, as aforementioned, it is also preferred to perform the carding/mixing of such organic fibers, in particular, thermoplastic resin fibers, after the carding, to perform pressing after melting at least a part of the organic fibers. Namely, it is also preferred that, by mixing an adequately small amount of organic fibers and melting at least a part of the organic fibers at a condition where carbon fibers are oriented so that an anisotropy is intentionally imparted to the carbon fibers such that the average value of orientation degrees falls within the aforementioned predetermined range, a function of a binder for maintaining the form of a sheet-like base material having a predetermined orientation degree is given to the organic fibers, and by performing pressing at such a condition, the maintained form is appropriately fixed via the organic fibers.

In a case where thermoplastic resin fibers are contained in a carbon fiber aggregate as described above, the content of carbon fibers in the carbon fiber aggregate is preferably 50 to 95 mass %, more preferably 70 to 95 mass %. If the content of carbon fibers is low, it becomes difficult to obtain high mechanical properties when a carbon-fiber-reinforced plastic is made and, to the contrary, if the content of thermoplastic resin fibers is too low, the above-described function of the thermoplastic resin fibers when the thermoplastic resin fibers are mixed to the carbon fiber aggregate cannot be expected, or becomes poor.

Further, it is preferred to provide a crimp to the above-described thermoplastic resin fibers to enhance the effect of tangle due to the thermoplastic resin fibers. The degree of the crimp is not particularly limited and, generally, thermoplastic resin fibers having a number of crimps of approximately 5 to 25 crests per 25 mm and a rate of crimps of approximately 3 to 30% can be used.

The material for such thermoplastic resin fibers is not particularly restricted, and it can be appropriately selected from a range that does not greatly reduce the mechanical properties of a carbon-fiber-reinforced plastic. For example, fibers can be used which are prepared by spinning a resin such as a polyolefin-group resin such as polyethylene or polypropylene, a polyamide-group resin such as nylon 6 or nylon 6,6, a polyester-group resin such as polyethylene terephthalate or polybutylene terephthalate, a polyetherketone, a polyethersulfone, or an aromatic polyamide. It is preferred that such a material for thermoplastic resin fibers is appropriately selected in accordance with the combination with a matrix resin of a carbon-fiber-reinforced plastic. In particular, thermoplastic resin fibers prepared using the same resin as a matrix resin, a resin having a compatibility with a matrix resin or a resin having a high adhesive property with a matrix resin are preferred, because the mechanical properties of a carbon-fiber-reinforced plastic are not lowered.

Further, a method of pressing, in a case where as described above the carding is performed at a condition of mixing organic fibers represented by thermoplastic resin fibers to carbon fibers and, after the carding, the pressing is performed after melting at least a part of the organic fibers, is not particularly restricted and, for example, a usual press machine for pressing at a condition of nipping with a flat plate, a calender roll machine for pressing at a condition of nipping with a pair of rolls and the like can be employed.

The method of impregnating a matrix resin into a sheet-like base material, formed so that the content ratio of carbon fibers having lengths of 10 mm or longer (preferably, 20 mm or longer) in the sheet-like base material is 60 wt % or more relative to the total amount of carbon fibers, and the average value of orientation degrees of carbon fibers contained in the sheet-like base material is 2-10, is not particularly restricted, and methods exemplified below can be employed. For example, it is possible to make a matrix resin as a sheet such as a film or a non-woven fabric, melt the matrix resin after laminating the sheet with a carbon fiber sheet-like base material and impregnate it, as needed, by pressing. As an apparatus that produces a stampable sheet by such a method, a known apparatus such as a double belt pressing machine or an intermittently pressing machine can be used. Further, a carbon-fiber-reinforced plastic can also be produced by a molding method wherein, after a matrix resin is impregnated into a carbon fiber sheet-like base material to prepare a prepreg or a semipreg, it is heated and solidified while being pressed in an autoclave.

Furthermore, as other molding methods, for example, a Resin Transfer Molding (RTM), a Resin Film Infusion (RFI), a Reaction Injection Molding (RIM), an injection molding such as a vacuum pressure molding and the like can also be employed and, among these methods, an RTM and a vacuum pressure molding are preferably employed from the viewpoint of cost of molding. As the RTM, for example, there is a molding method of injecting a pressurized matrix resin into a cavity formed by a male mold and a female mold and, preferably, the resin is injected at a condition where the cavity is reduced in pressure. Further, as the vacuum pressure molding, for example, there is a molding method of reducing in pressure a cavity formed by one of a male mold and a female mold and a bag material made of a film and the like (for example, a nylon film, a silicone rubber and the like) and injecting a matrix resin by a pressure difference with an atmospheric pressure and, preferably, a resin distribution medium (media) is disposed to a preform in the cavity to accelerate resin impregnation and, after molding, the medium is separated from a composite material.

Figure 2:
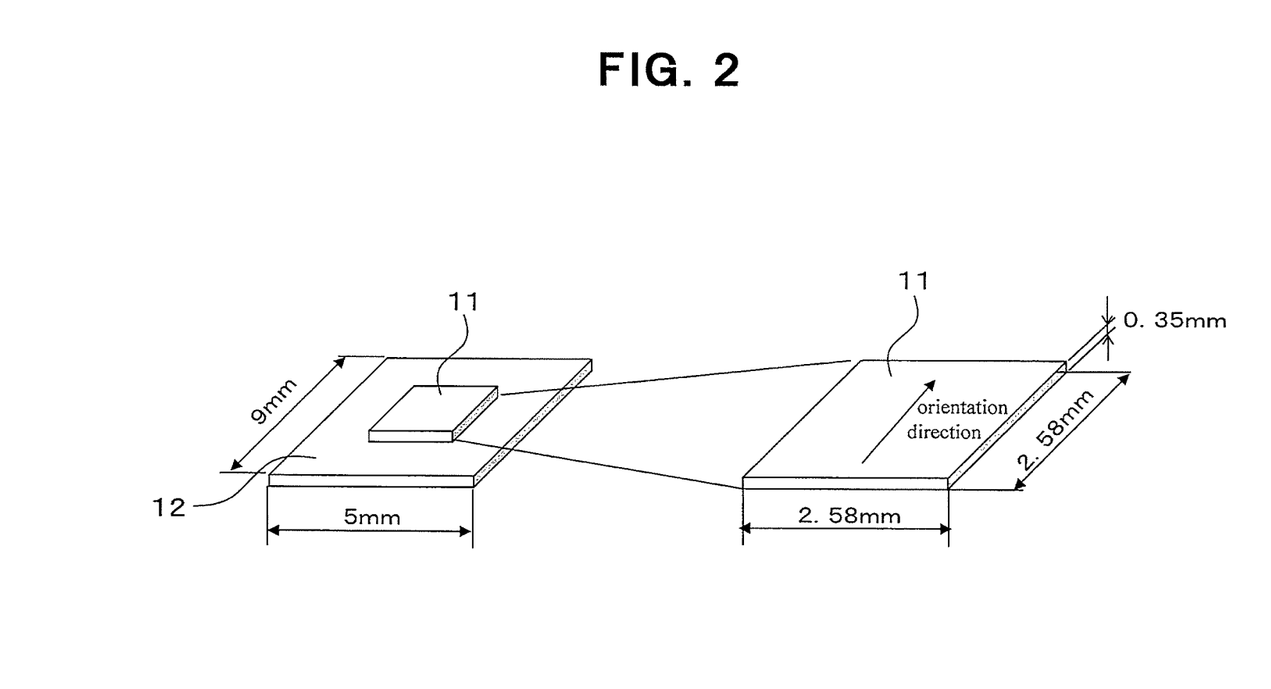
FIG. 2 is a schematic perspective view of a sample for determination of orientation degree.
Figure 3:
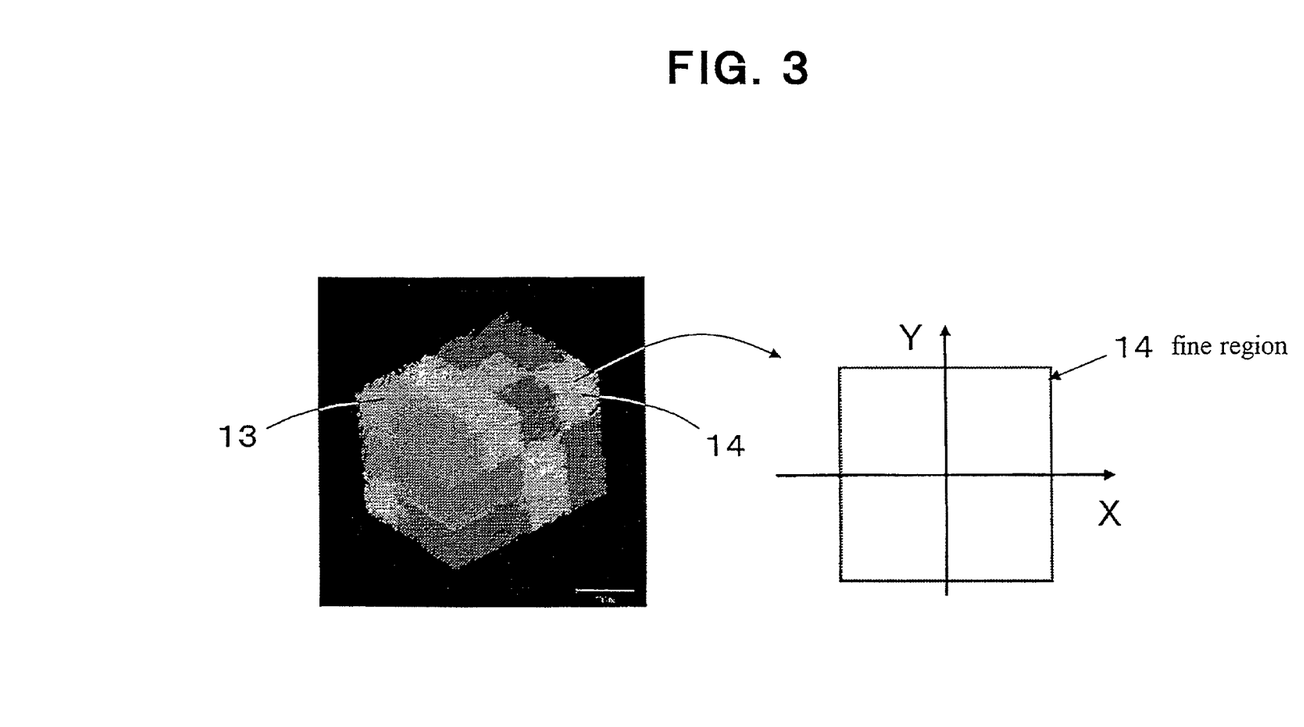
FIG. 3 is a schematic perspective view of a block-like fine region divided from three-dimensional data obtained by photographing a sample for determination with an X-ray CT and a modified diagram in case of setting axes of coordinates thereto.

Next, the method of determining the orientation degree of carbon fiber will be explained.
1. Apparatus:
   X-ray CT: supplied by Yamato Scientific Co., Ltd., TDM1000-IS
2. Software to calculate orientation degree:
   TRI-3D supplied by Ratoc System Engineering Co., Ltd., VOL R8.0
3. From a sheet-like base material composed of discontinuous carbon fibers after carding, a sample for determination 11 having a size of 2.58×2.58×0.35 mm as shown in FIG. 2 was taken out, and it was placed on a base table 12 to perform the following determination. This sample 11 was divided into block-like regions at a condition of 20×20×10 as follows (the pitch is same as the size of a block), the determination of orientation degree and the calculation were carried out. Where, the orientation direction of sample 11 in FIG. 2 coincides with the direction of carding.
4. Determination and calculation of orientation degree:
(1) As shown in FIG. 3, three-dimensional image data 13 obtained by photographing the above-described sample by X-ray CT are divided into block-like fine regions 14 (the number of division is described above). However, the size of a fine region may be appropriately adjusted in accordance with the size of carbon fiber.
(2) As shown in FIG. 3, one fine region 14 is taken out from the above-described three-dimensional image data 13, axes of coordinates are set. To facilitate the explanation, it will be explained at a two-dimensional condition of X and Y axes.

Figure 4:
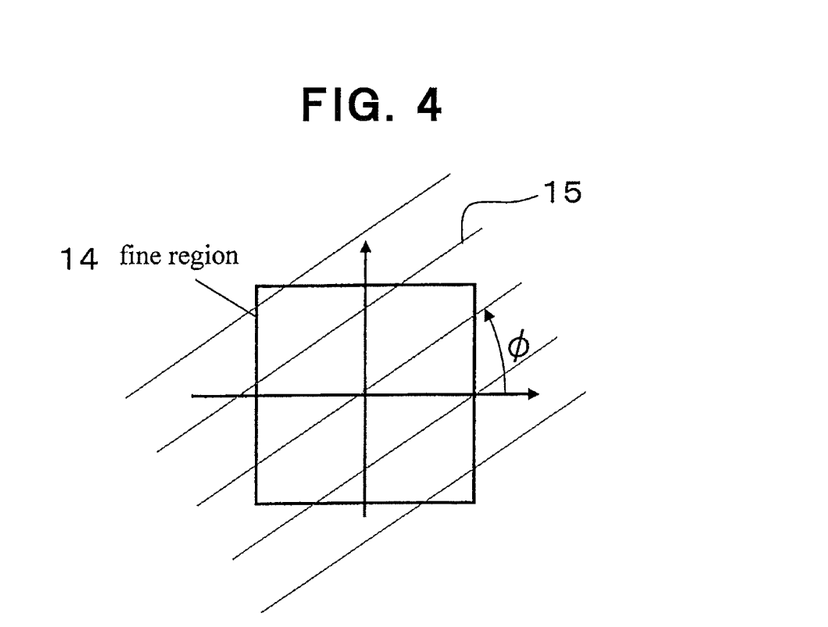
FIG. 4 is a modified diagram showing a state where scanning lines are drawn in parallel at a certain angle $\phi$ from one axis among the set axes of coordinates.

(3) Next, as shown in FIG. 4, relative to the set axes of coordinates, scanning lines 15 are drawn in parallel at a certain angle φ from one axis. The pitch of the scanning lines may be appropriately adjusted in accordance with the size of carbon fiber.

Figure 5:
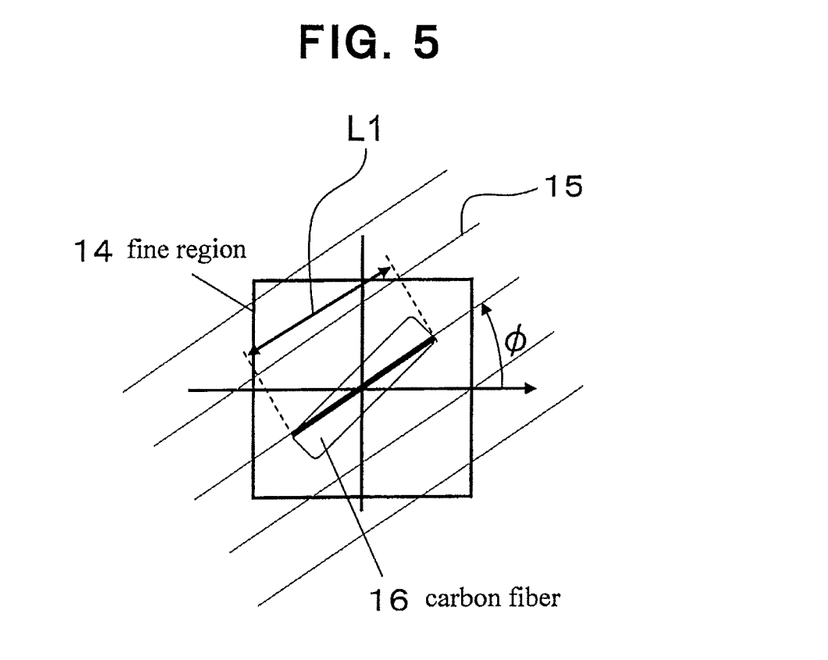
FIG. 5 is a modified diagram showing an aspect for determining an average cross length of a part crossed with a carbon fiber present in a fine region and a scanning line.

(4) Next, as shown in FIG. 5, an average length of a part crossed with a carbon fiber 16 present in the fine region 14 and the scanning line 15 (an average cross length L1) is determined. In practice, because there are a plurality of fibers, an average length of parts crossed with of a part crossed with scanning lines 15 is determined.

Figure 6:
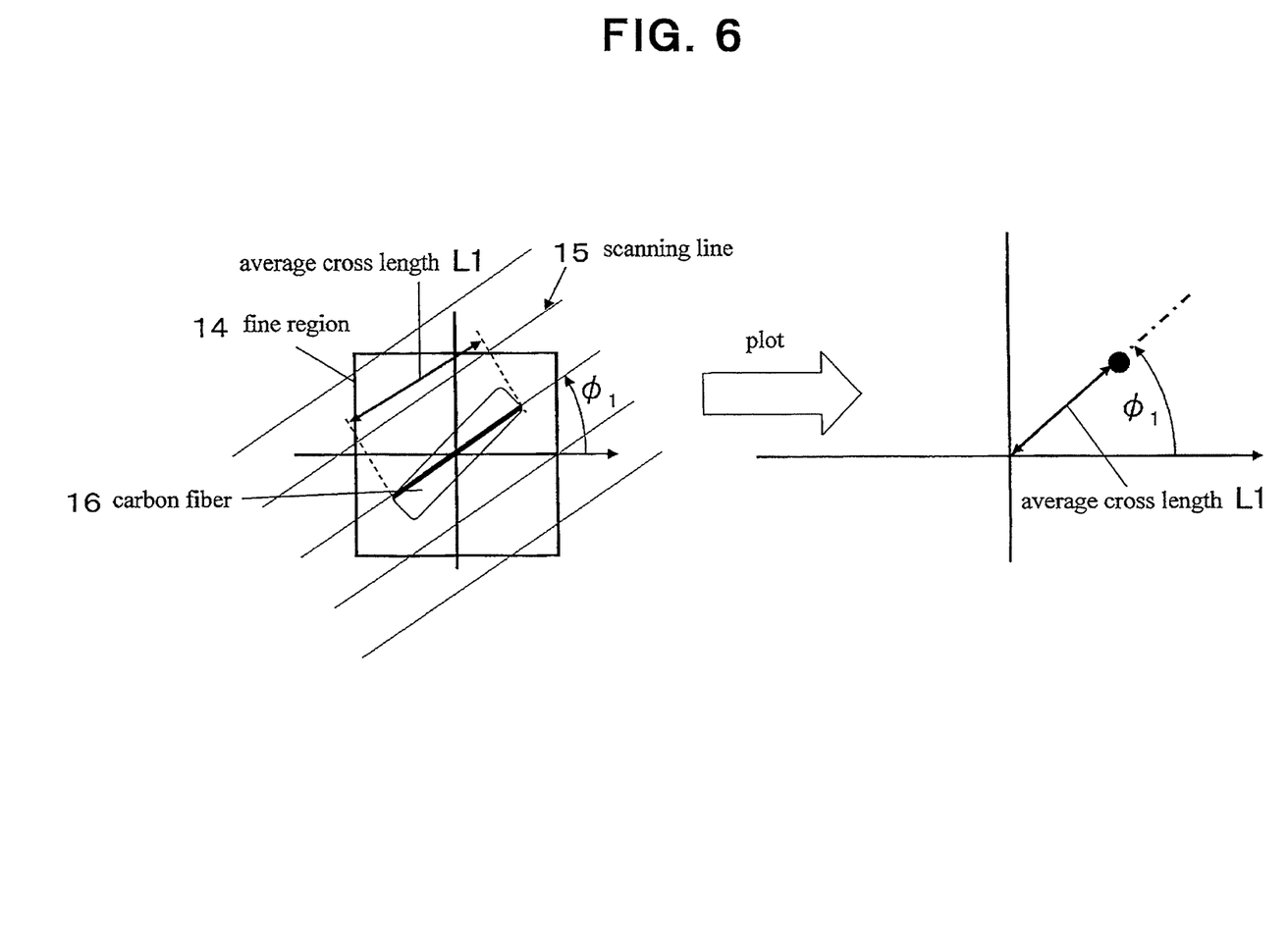
FIG. 6 is a graph plotted with an average cross length as a function of an angle of a scanning line.

(5) Next, as shown in FIG. 6, the average cross length L1 is plotted in another graph as a function of an angle φ of the scanning line 15 (in FIG. 6, it is plotted with respect to a certain angle φ1 of the scanning line 15).

Figure 7:
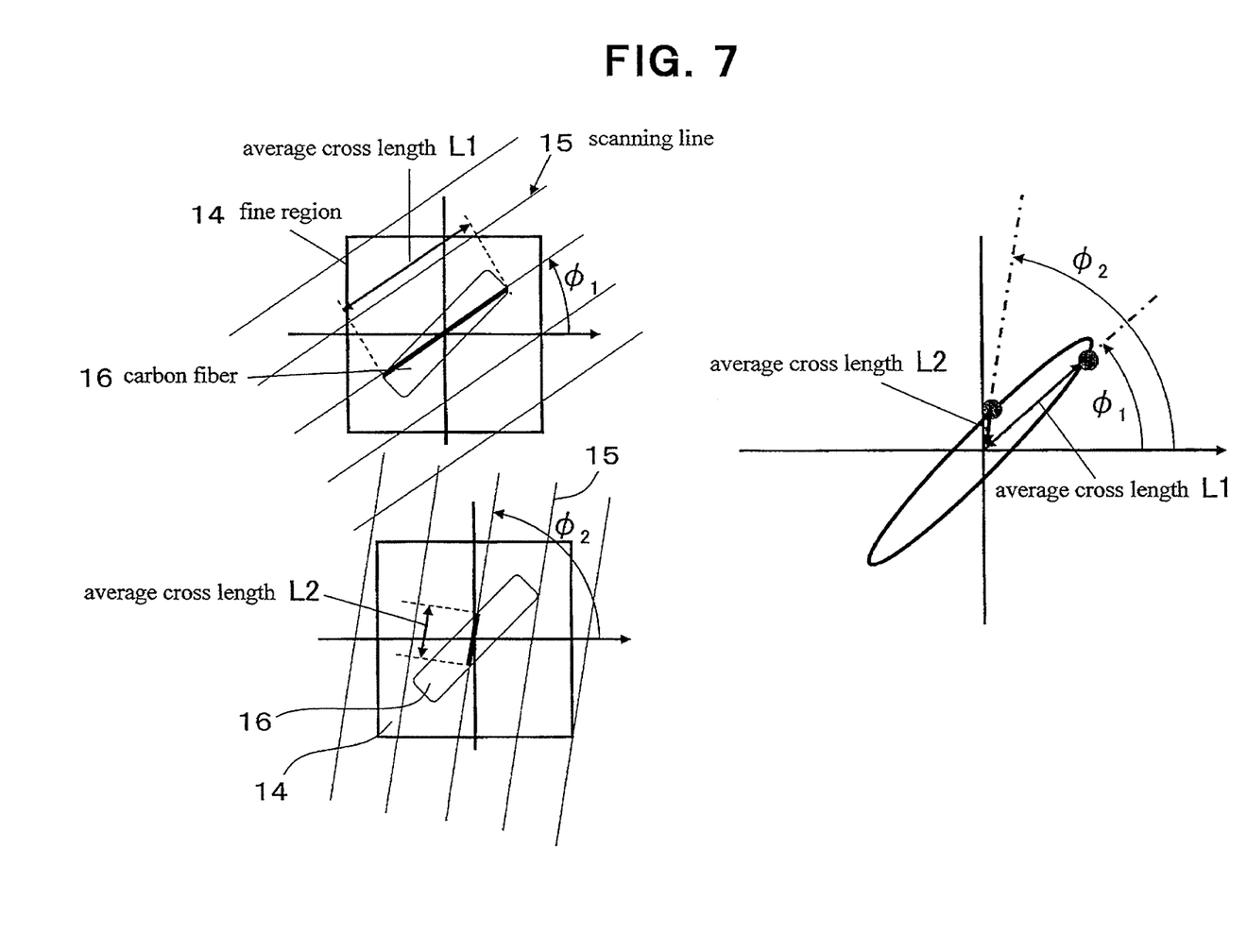
FIG. 7 is a modified diagram showing an aspect for plotting a plurality of average cross lengths as functions of angles of scanning lines.

(6) Next, as shown in FIG. 7, changing the angle φ of the scanning lines 15, the operations of the above-described (4) and (5) are repeated, and the average cross lengths determined as distances from the origin are plotted by functions of the angles φ of the scanning lines 15. In FIG. 7, a diagram plotting as to average cross length L1 and average cross length L2 is depicted.

Figure 8:
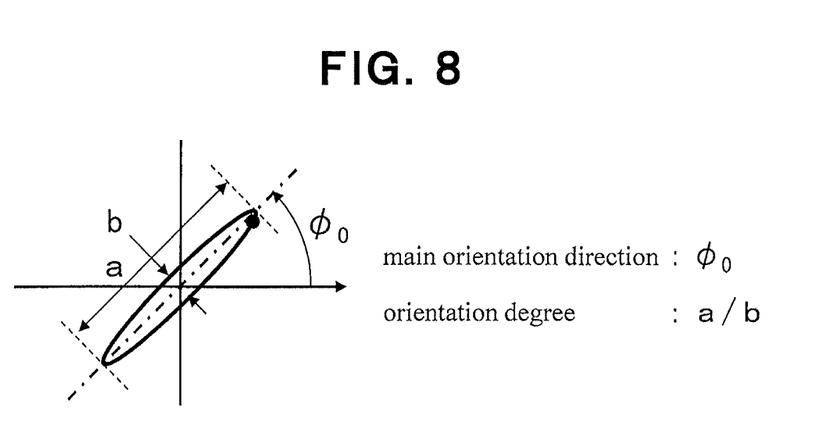
FIG. 8 is a modified diagram showing an aspect for determining a long diameter "a," a short diameter "b" and an angle of long diameter $\phi 0$ in the graph plotted with an average cross length as a function of an angle $\phi$ of a scanning line.
Figure 9:
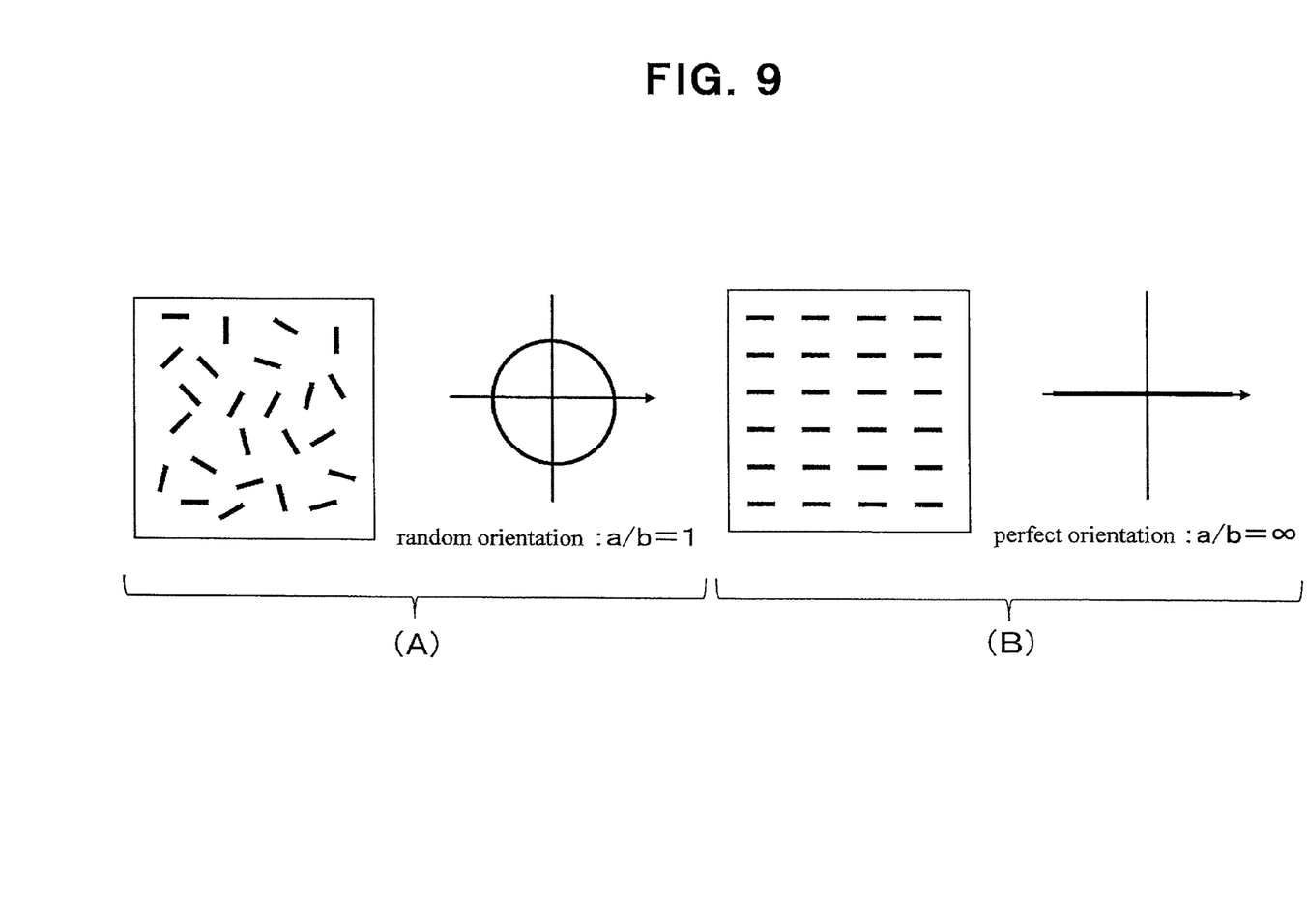
FIG. 9 shows graphs plotted with average cross lengths as functions of angles $\phi$ of scanning lines in case where carbon fibers are randomly oriented and in case where they are oriented perfectly in one direction.

(7) Next, as shown in FIG. 8, a long diameter "a", a short diameter "b" and an angle of long diameter $\phi_0$ are determined in the graph plotted with an average cross length as a function of an angle φ of a scanning line. The angle of long diameter $\phi_0$ is defined as a main orientation direction, and the ratio a/b of the long diameter to the short diameter is defined as an orientation degree. The average value of this orientation degree is to be controlled within a predetermined range. In this connection, in a case where carbon fibers are randomly oriented perfectly, the graph shown in the above-described FIG. 8 becomes a true circle as shown in FIG. 9(A) (random orientation: a/b=1). On the other hand, in a case where carbon fibers are oriented perfectly in one direction, the graph shown in the above-described FIG. 8 becomes a straight line as shown in FIG. 9(B) (perfect orientation: a/b=∞).

Figure 10:
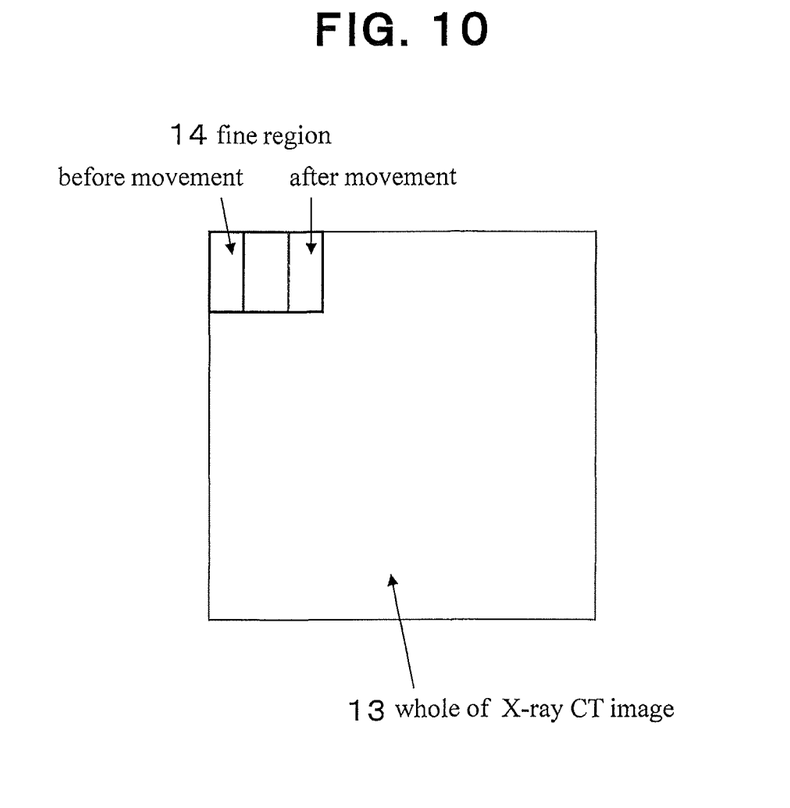
FIG. 10 is a modified diagram showing an aspect for moving a fine region relatively to the whole of X-ray CT image.

(8) Next, as shown in FIG. 10, the fine region 14 is moved, and the operations of the above-described (2) to (7) are repeated relatively to the whole of X-ray CT image 13. There is a case that it is preferred to overlap with a region before movement when moved.

Figure 11:
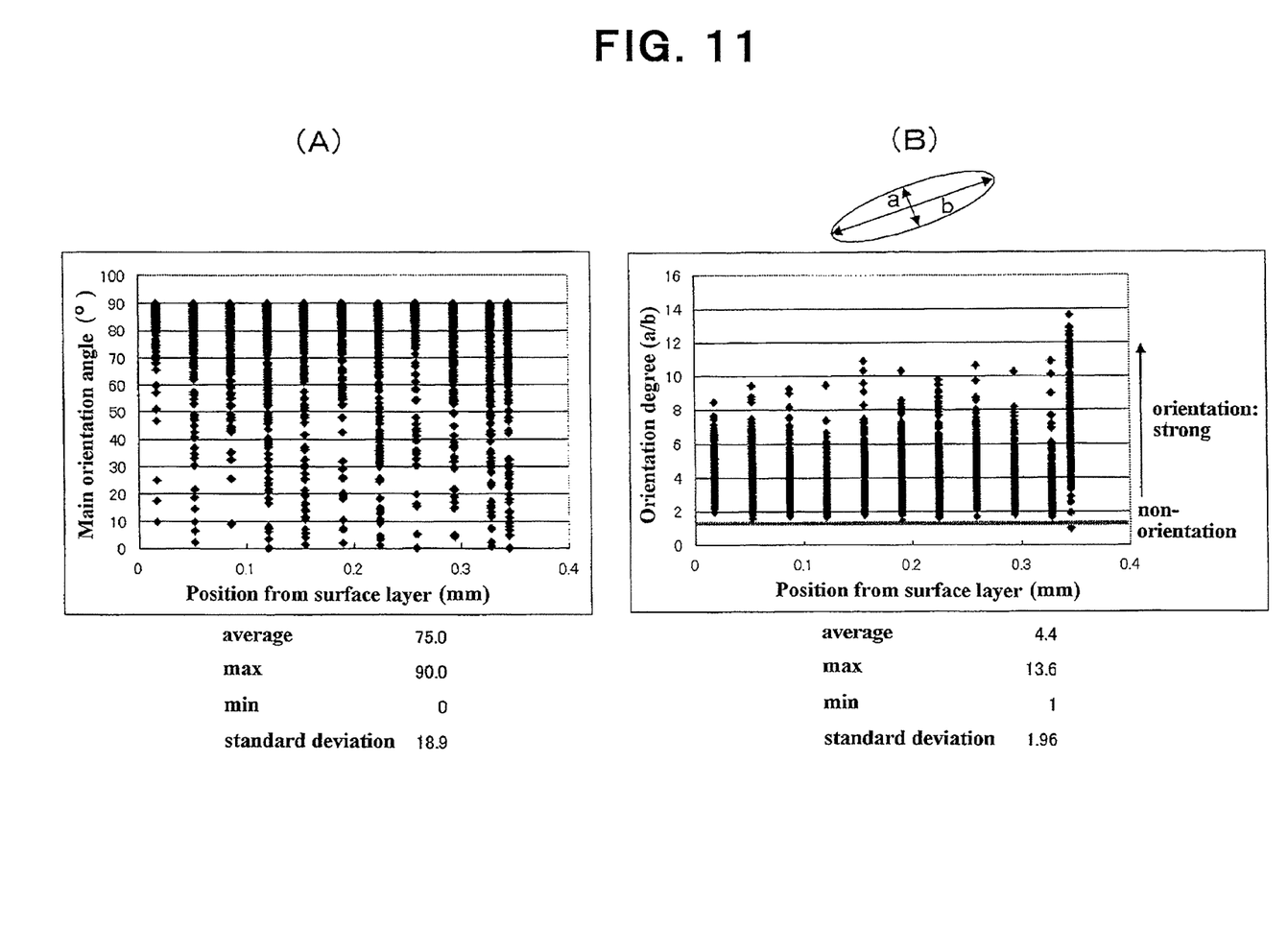
FIG. 11 shows graphs showing an example determined and calculated with average values of main orientation angle and orientation degree.

FIG. 11 exemplifies an example (within our range) determining and calculating the main orientation angle and our average value of the orientation degrees by the above-described manner.

Next, a manner of determining the ratio of bundle-like fiber aggregates will be explained hereunder, in a case where, with respect to carbon fibers contained in the sheet-like base material composed of discontinuous carbon fibers, the ratio of bundle-like fiber aggregates each gathered with 80 or more carbon fibers relative to the total amount of carbon fibers contained in the sheet-like base material is controlled at 3 wt % or more and 40 wt % or less.

A sample with a size 100 mm×100 mm was cut out from a carbon fiber composite material and, thereafter, organic substances such as matrix resin were burned by heating the sample approximately for one hour in an electric furnace heated at 500° C. After the mass of the carbon fiber aggregates left after cooling down to a room temperature was measured, all carbon fiber bundles were extracted by a pincette from the carbon fiber aggregates. With respect to all the carbon fiber bundles extracted, using a balance capable of measurement at a level up to 1/10,000g, a weight Mn and a length Ln of each carbon fiber bundle are measured. When a diameter of a carbon fiber is referred to as "r" and a specific weight thereof is referred to as "ρ," the number of carbon fibers forming the bundle "N" is calculated by the equation:

$$N=Mn/(r^2 \times 3.14 \times Ln \times \rho).$$

Fiber bundles, which were refined at a degree that could not be extracted by a pincette, were together measured in weight at the last stage. After the above-described measurement, the rate of the bundle-like fiber aggregates was determined by dividing the value, summed up with the weights of only bundles having an "N" of 80 or more, with the weight of the whole of the carbon fiber aggregates.

EXAMPLES

Example 1

After carbon fibers ("T700S," produced by Toray Industries, Inc., density: 1.8, diameter: 7 μm, number of filaments: 12,000) were cut at a length of 50 mm, they were fed into an opening machine to obtain refined carbon fibers. The refined carbon fibers were fed again into the opening machine and floc-like carbon fibers in which carbon fiber bundles almost did not exist were obtained. The floc-like carbon fibers were fed into a carding machine having a structure as shown in FIG. 1 which has a cylinder roll with a diameter of 600 mm to form a sheet-like web composed of carbon fibers. At that time, the rotational speed of the cylinder roll was 350 rpm, and the speed of the doffer roll was 15 m/min. In this carding step, falling off and winding onto the rolls of the carding machine of carbon fibers did not occur. After this web was stacked by a cross-wrapper, a carbon fiber non-woven fabric performed with needle punching at 50/cm$^2$ was obtained. At that time, the swinging width of the cross-wrapper was 1.2 m, and the winding speed of the carbon fiber non-woven fabric was 1 m/min. The orientation degree of this carbon fiber non-woven fabric was 4.4. When the tensile strengths of this carbon fiber non-woven fabric were measured changing the measurement directions at an angle interval of 15°, the ratio of the maximum value to the minimum value was 4.0.

A nylon 6 resin ("CM1001" produced by Toray Industries, Inc.) was impregnated into this carbon fiber non-woven fabric to prepare a CFRP sheet having a fiber volume content Vf of 30%. When the tensile elastic moduli of this CFRP were measured changing the measurement directions at an angle interval of 15°, the minimum value was 13 GPa and the maximum value was 40 GPa. When a reinforcement material for a vehicle hood was made using this CFRP, the reinforcement material for a vehicle hood could be made with a small amount of the CFRP by disposing the material aligning the direction of a high elastic modulus of the CFRP in a direction applied with a load, and the weight thereof could be reduced by 50% as compared with a conventional steel reinforcement material having the same rigidity.

Comparative Example 1

At the time of carding, nylon 6 discontinuous fibers (single fiber fineness: 1.7 dtex, cut length: 51 mm, number of crimps: 12/25 mm, crimp rate: 15%) were mixed to carbon fibers at a mass ratio of 50:50 to prepare a carbon fiber/nylon 6 mixed non-woven fabric. At that time, the swinging width of the cross-wrapper was 1.2 m, and the winding speed of the non-woven fabric was 3 m/min. The orientation degree of this non-woven fabric was 1.7. When the tensile strengths of this non-woven fabric were measured changing the measurement directions at an angle interval of 15°, the ratio of the maximum value to the minimum value was 1.5. A nylon 6 resin ("CM1001" produced by Toray Industries, Inc.) was impregnated into this non-woven fabric to prepare a CFRP sheet having a Vf of 30%. When the tensile elastic moduli of this CFRP were measured changing the measurement directions at an angle interval of 15°, the minimum value was 20 GPa and the maximum value was 30 GPa. When a reinforcement material was made using this CFRP in a manner similar to that in Example 1, the weight thereof could be reduced by only 35% as compared with a conventional steel reinforcement material having the same rigidity.

Comparative Example 2

To enhance orientation of carbon fibers in a web, at the time of carding, the rotational speed of the cylinder roll was set at 550 rpm, the gap between the cylinder roll and the worker rolls was set at ½ of Example 1, the feeding amount of carbon fibers was set at ½ of Example 1, and the winding speed of the non-woven fabric was set at 0.5 m/min. to prepare a carbon fiber non-woven fabric. The orientation degree of the obtained carbon fiber non-woven fabric was 11. When the tensile strengths of this non-woven fabric were measured changing the measurement directions at an angle interval of 15°, the ratio of the maximum value to the minimum value was 12.0. In such a carding condition, carbon fibers were liable to wind onto the cylinder roll and the like of the carding machine and it was difficult to prepare the carbon fiber non-woven fabric continuously. Further, because the feeding amount of carbon fibers could not be increased, the production efficiency became very low. A nylon 6 resin ("CM1001" produced by Toray Industries, Inc.) was impregnated into this non-woven fabric to prepare a CFRP sheet having a Vf of 30%. When the tensile elastic moduli of this CFRP were measured changing the measurement directions at an angle interval of 15°, the minimum value was 10 GPa and the maximum value was 55 GPa. When a reinforcement material was made using this CFRP in a manner similar to that in Example 1, the weight thereof could be reduced by 60% as compared to a conventional steel reinforcement material having the same rigidity.

Example 2

At the time of carding, nylon 6 discontinuous fibers (single fiber fineness: 1.7 dtex, cut length: 51 mm, number of crimps: 12/25 mm, crimp rate: 15%) were mixed to carbon fibers at a mass ratio of 90:10 to prepare a carbon fiber/nylon 6 mixed non-woven fabric. At that time, the swinging width of the cross-wrapper was 1.2 m, and the winding speed of the non-woven fabric was 1 m/min. Further, after hot air with a temperature Of 280° C. was blown onto both surfaces of the non-woven fabric before winding of the non-woven fabric, the nylon 6 discontinuous fibers were molten and solidified by nipping the non-woven fabric with cooling rolls into which cooling water was flowed. The orientation degree of this non-woven fabric was 3.9. When the tensile strengths of this non-woven fabric were measured changing the measurement directions at an angle interval of 15°, the ratio of the maximum value to the minimum value was 2.5. A nylon 6 resin ("CM1001" produced by Toray Industries, Inc.) was impregnated into this non-woven fabric to prepare a CFRP sheet having a Vf of 30%. When the tensile elastic moduli of this CFRP were measured changing the measurement directions at an angle interval of 15°, the minimum value was 15 GPa and the maximum value was 35 GPa. When a reinforcement material was made using this CFRP in a manner similar to that in Example 1, the weight thereof could be reduced by 55% as compared with a conventional steel reinforcement material having the same rigidity.

Comparative Example 3

A carbon fiber non-woven fabric was prepared in the same manner as that in Example 1 other than a condition where the number of needle punching was set at 500/cm$^2$. The orientation degree of this non-woven fabric was 1.7. When the tensile strengths of this non-woven fabric were measured changing the measurement directions at an angle interval of 15°, the ratio of the maximum value to the minimum value was 1.5. A nylon 6 resin ("CM1001" produced by Toray Industries, Inc.) was impregnated into this carbon fiber non-woven fabric to prepare a CFRP sheet having a Vf of 30%. When the tensile elastic moduli of this CFRP were measured changing the measurement directions at an angle interval of 15°, the minimum value was 22 GPa and the maximum value was 29 GPa. When a reinforcement material for a vehicle hood was made using this CFRP, the reinforcement material for a vehicle hood could be made with a small amount of the CFRP by disposing the material aligning the direction of a high elastic modulus of the CFRP in a direction applied with a load, but the weight thereof could be reduced by only 30% as compared with a conventional steel reinforcement material having the same rigidity.

INDUSTRIAL APPLICATIONS

The carbon-fiber-reinforced plastic and the process of producing the same can be applied to any carbon-fiber-reinforced plastic made by preparing a sheet-like base material using discontinuous carbon fibers and impregnating a resin thereinto.

The invention claimed is:

1. A carbon-fiber-reinforced plastic prepared by impregnating a matrix resin into a sheet-like base material composed of discontinuous carbon fibers, wherein the content of carbon fibers having lengths of 10 mm or longer in said base material is 60 wt % or more relative to the total amount of carbon fibers, an average value of orientation degrees of carbon fibers contained in said base material is 2-10, and with respect to carbon fibers contained in said sheet-like base material, the ratio of bundle-like fiber aggregates each gathered with 80 or more carbon fibers relative to the total amount of carbon fibers contained in said sheet-like base material is 3 wt % or more and 40 wt % or less.

2. The carbon-fiber-reinforced plastic according to claim 1, wherein the maximum value σMax of tensile elastic moduli determined in different tensile directions is 10 GPa or more.

3. The carbon-fiber-reinforced plastic according to claim 1, wherein the ratio of the maximum tensile elastic moduli of the carbon-fiber-reinforced plastic to the minimum tensile elastic moduli of the carbon-fiber-reinforced plastic (σMax/σMin) determined in different tensile directions is 2-10.

4. The carbon-fiber-reinforced plastic according to claim 1, wherein said matrix resin comprises a thermoplastic resin.

5. The carbon-fiber-reinforced plastic according to claim 2, wherein the ratio of the maximum tensile elastic moduli of the carbon-fiber-reinforced plastic to the minimum tensile elastic moduli of the carbon-fiber-reinforced plastic (σMax/σMin) determined in different tensile directions is 2-10.

6. The carbon-fiber-reinforced plastic according to claim 2, wherein said matrix resin comprises a thermoplastic resin.

7. The carbon-fiber-reinforced plastic according to claim 3, wherein said matrix resin comprises a thermoplastic resin.

8. A carbon-fiber-reinforced plastic prepared by impregnating a matrix resin into a sheet-like base material composed of discontinuous carbon fibers, wherein the content of carbon fibers having lengths of 10 mm or longer in said base material is 60 wt % or more relative to the total amount of carbon fibers, an average value of orientation degrees of carbon fibers contained in said base material is 2-10, and the maximum value Wax of tensile elastic moduli determined in different tensile directions is 10 GPa or more, and with respect to carbon fibers contained in said sheet-like base material, the ratio of bundle-like fiber aggregates each gathered with 80 or more carbon fibers relative to the total amount of carbon fibers contained in said sheet-like base material is 3 wt % or more and 40 wt % or less.

9. A carbon-fiber-reinforced plastic prepared by impregnating a matrix resin into a sheet-like base material composed of discontinuous carbon fibers, wherein the content ratio of carbon fibers having lengths of 10 mm or longer in said base material is 60 wt % or more relative to the total amount of carbon fibers, an average value of orientation degrees of carbon fibers contained in said base material is 2-10, and the ratio of the maximum tensile elastic moduli of the carbon-fiber-reinforced plastic to the minimum tensile elastic moduli of the carbon-fiber-reinforced plastic (σMax/σMin) determined in different tensile directions is 2-10, and with respect to carbon fibers contained in said sheet-like base material, the ratio of bundle-like fiber aggregates each gathered with 80 or more carbon fibers relative to the total amount of carbon fibers contained in said sheet-like base material is 3 wt % or more and 40 wt % or less.

10. A carbon-fiber-reinforced plastic prepared by impregnating a matrix resin into a sheet-like base material composed of discontinuous carbon fibers, wherein the content of carbon fibers having lengths of 10 mm or longer in said base material is 60 wt % or more relative to the total amount of carbon fibers, an average value of orientation degrees of carbon fibers contained in said base material is 2-10, and said matrix resin comprises a thermoplastic resin, and with respect to carbon fibers contained in said sheet-like base material, the ratio of bundle-like fiber aggregates each gathered with 80 or more carbon fibers relative to the total amount of carbon fibers contained in said sheet-like base material is 3 wt % or more and 40 wt % or less.

* * * * *